Nov. 14, 1967     D. J. BURKE     3,352,578

WELDED PIPE JOINTS

Filed July 23, 1965     2 Sheets-Sheet 1

INVENTOR.
DONALD J. BURKE

BY

ATTORNEYS

Nov. 14, 1967  D. J. BURKE  3,352,578
WELDED PIPE JOINTS
Filed July 23, 1965  2 Sheets-Sheet 2
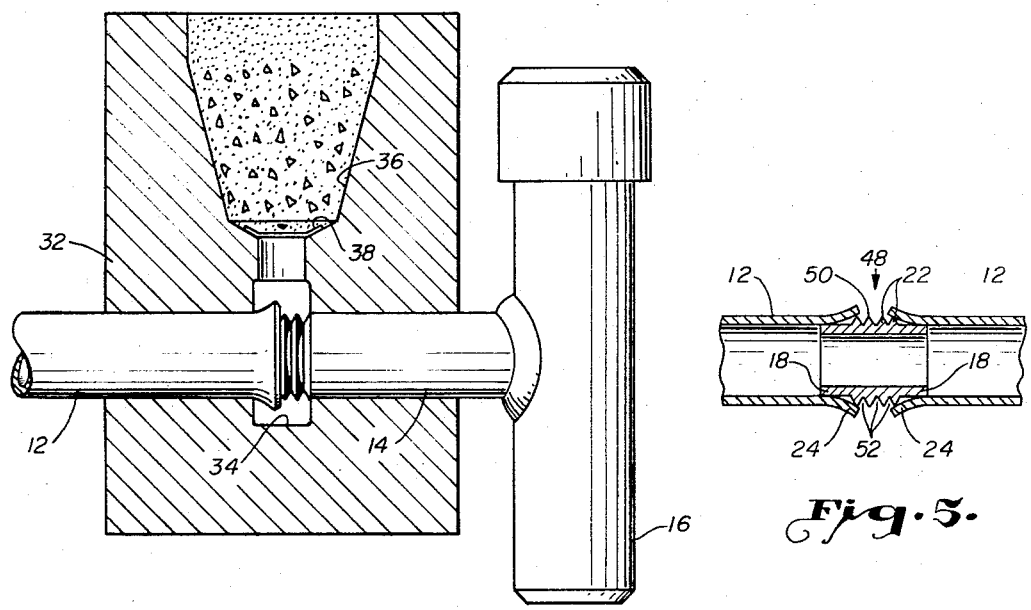
Fig. 3.
Fig. 5.
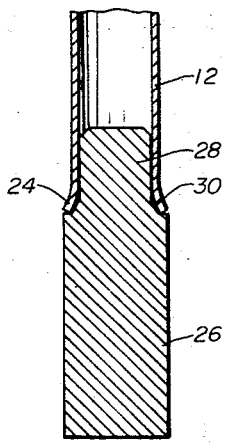
Fig. 6.
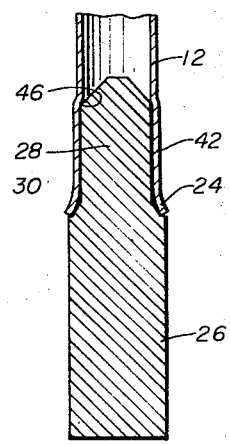
Fig. 8.
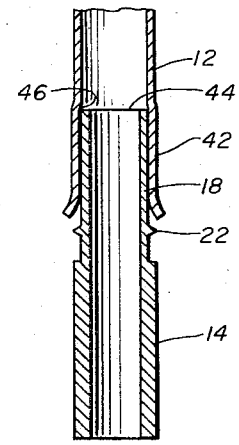
Fig. 7.
INVENTOR.
DONALD J. BURKE
BY
*Head & Johnson*
ATTORNEYS

United States Patent Office 3,352,578
Patented Nov. 14, 1967

3,352,578
WELDED PIPE JOINTS
Donald J. Burke, Tulsa, Okla., assignor to Continental Industries, Inc., Tulsa, Okla., a corporation of Oklahoma
Filed July 23, 1965, Ser. No. 474,263
2 Claims. (Cl. 285—286)

ABSTRACT OF THE DISCLOSURE

This invention is for a pipe joint for welding a length of tubing to a length of pipe wherein the tubing and the pipe have substantially the same external diameter. The tubing is enlarged for a length at the end to be welded. The pipe end to be welded is provided with a reduced diameter portion at the end to be joined. The reduced diameter portion of the pipe is inserted within the enlarged end portion of the tubing prior to welding. The pipe is further provided with an annular groove adjacent the reduced diameter end portion providing a raised annular ring portion which is adjacent the enlarged end portion of the tubing when the joint is assembled for welding. The annular ring on the pipe provides an area easily heated to welding temperature so that at least this portion of the pipe is brought within welding temperature concurrently with the tubing.

---

This invention relates to a pipe joint adaptable for welding a length of tubing to a length of pipe, such length of pipe usually being a part of a transition fitting. More particularly, the invention relates to a pipe joint adaptable for efficient exothermic welding of two lengths of pipe together, particularly wherein the two lengths of pipe have substantially the same outside diameter and one of the lengths is thin walled and the other thick walled. In one embodiment, the invention includes a coupling device for use in welding together two lengths of thin walled pipe or tubing.

In recent years the use of thin walled metallic tubing in the gas distribution industry has gained in importance. Thin walled pipe or tubing as it is called is usually manufactured in long lengths and packaged in coils. It is particularly usable in connecting a residence to a gas main.

Problems in connection with the use of tubing in gas distribution are those of welding the tubing to a T-fitting or other usual type of transition fitting having a pipe portion and welding the two lengths of thin walled tubing together. These problems have been particularly difficult with the use of exothermic welding equipment, a type of welding well known in the gas industry. Exothermic welding consists basically of the chemical reaction of powdered ingredients to produce a flow of liquid weld material which, being confined by a mold, functions to weld together two or more pieces of metal. The exothermic welding process has many advantages, most important of which is that it requires very little equipment and no outside source of power.

The exothermic reaction produces an extremely hot flow of molten metal. One of the problems, and the basic one, which has interfered with the ready adaptation of the exothermic welding process to the welding of thin walled tubing is that the molten weld metal easily penetrates the thin metal wall thereby entering the tubing and blocking it. If attempt is made to reduce the temperature of the molten flow, an equally difficult problem arises in attempting to weld thin walled tubing to a heavier walled pipe. It is imperative that the heavier walled pipe be brought to welding temperature, without at the same time melting through the wall of the thin walled pipe. This invention provides a means of exothermically welding a thin walled pipe or tubing to a heavier walled pipe.

It is an object of this invention to provide an improved pipe joint adaptable for use in exothermically welding a thin walled tubing length to a length of thicker walled pipe.

Another object of this invention is to provide a pipe joint adaptable to weld two lengths of thin walled pipe together.

These and other objects of the invention will be seen and a better understanding of the invention will be had by referring to the following description and claims taken in conjunction with the attached drawings in which:

FIGURE 3 is a cross-sectional view of a mold as utilized in the exothermic welding process showing the pipe joint of this invention encompassed within the mold ready to be welded.

FIGURE 5 is a cross-sectional view of an improved pipe joint of this invention showing two lengths of thin walled pipe tubing ready to be welded together.

FIGURE 6 is a cross-sectional view showing the cross-sectional configuration of a punch as used to flare the end of thin walled tubing to prepare it as a portion of the pipe joint of this invention.

FIGURE 7 is an alternate embodiment of this invention wherein a single external angular ring is utilized.

FIGURE 8 is a cross-sectional view of a punch inserted within a length of thin walled tubing to expand and flare the end portion to form a part of the pipe joint as shown in FIGURE 7.

The invention may be described as a pipe joint adaptable for welding two lengths of pipe together. More particularly, but not by way of limitation, the invention may be described as a pipe joint for welding together two lengths of pipe having substantially the same outside diameter, one of the lengths having a thinner walled construction and the other of a thicker walled construction, the end portion of the thin walled pipe being flared and the end portion of the thicker walled pipe being machined to provide at least one, and preferably a plurality, of annular ring portions adjacent a reduced end portion which is inserted within the thin walled pipe, the external annular ring portion and the externally extending lip of the thin walled pipe formed by the flaring thereof providing areas easily heated by exothermic welding metal for improved bonding of the two lengths of pipe together.

Figure 1:
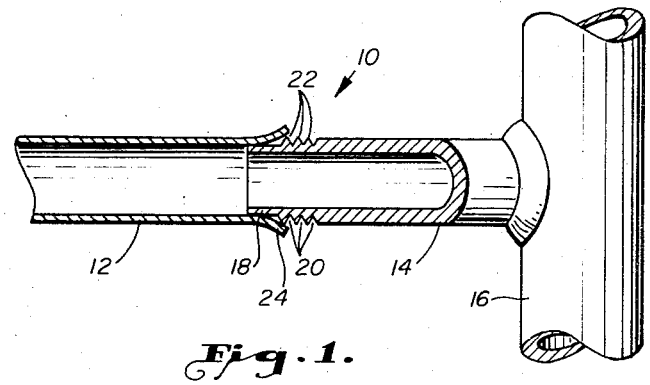
FIGURE 1 is a view, partially in cross-section, showing the pipe joint of this invention as utilized to adapt the welding of a thin walled pipe or tubing to a thicker walled pipe.

Referring now to the drawings and first to FIGURE 1, the pipe joint of this invention is indicated generally by the numeral 10 and is provided as a means of welding together two lengths of pipe, the first length, indicated by the numeral 12, being of thin walled construction and the other being a length of thicker walled pipe, indicated by the numeral 14. The terms "thin walled" and "thick walled" are used relatively, that is, the wall of the thin walled pipe is relatively thinner than the wall of the pipe to which it is to be joined.

Throughout this description, thin walled pipe will be referred to as "tubing" and the thicker walled pipe simply as "pipe." Usually the thicker walled pipe or "pipe" is a portion of a transition fitting, such as the T-fitting illustrated in the drawings.

Figure 4:
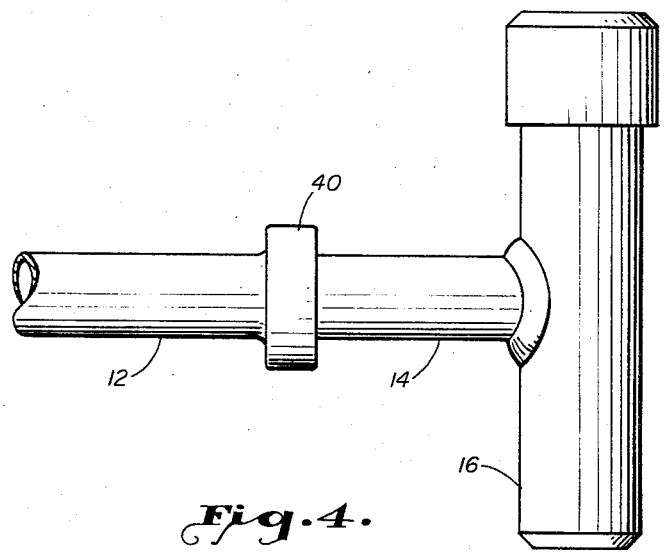
FIGURE 4 is an external view of a length of thin walled tubing welded to a T-fitting by the exothermic process.

In FIGURE 1, the pipe 14 is shown extending from a third length of pipe 16 which may be, as an example, a gas main or, as shown in FIGURES 3 and 4, pipe 16 may constitute the body of a T-fitting which is adaptable to be welded to a gas main to provide an outlet.

The pipe 14 is prepared to form the joint of this invention by providing a reduced diameter external portion 18 and by the provision of at least one and preferably three or more anular grooves 20 in the exterior of the pipe adjacent the reduced diameter portion 18. The annular grooves 20, which are preferably, as shown, of a V-shaped cross-sectional configuration, provide raised annular ring portions 22 which also are preferably of V-shaped cross-sectional configuration.

Tubing 12 is prepared to form the joint of this invention by flaring the end 24 thereof. This is easily accomplished by the use of a standard tube flaring tool, or a punch mandrel, such as shown in FIGURE 6. The punch 26 has a reduced diameter end portion 28 substantially equal the internal diameter of tubing 12. Adjacent the reduced diameter is a conical portion 30. When the reduced diameter portion 28 is inserted into tubing 12, the blow of a hammer on the punch 26 causes the tubing end 24 to flare outwardly. In addition to the flaring 24, some enlargement of the internal diameter of the tubing 12 adjacent the flared end 24 may be provided.

Referring again to FIGURE 1, the reduced diameter end portion 18 of pipe 14 is substantially equal to the internal diameter of the tubing 12 or at least is substantially equal to the interior diameter of the tubing as expanded by the punch mandrel of FIGURE 6 so that the reduced diameter end portion 18 slidably but snugly fits within the interior of the tubing 12.

The joint is assembled by inserting the reduced diameter portion 18 of pipe 14 within tubing 12 so that the first raised annular ring portion 22 engages the flared end 24 of the tubing.

Figure 2:
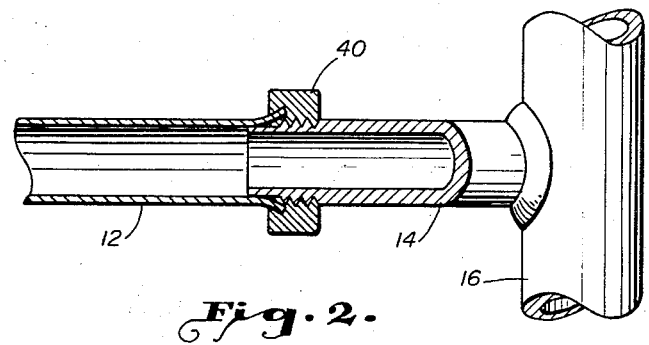
FIGURE 2 is a cross-sectional view as in FIGURE 1 showing the thin walled pipe or tubing welded to the pipe by an exothermic welding process.

After the joint is assembled it is encompassed within a mold 32, best shown in FIGURE 3. Mold 32 is typically made of graphite and is bifurcated so that it easily is placed around the joined tubing and pipe. The mold includes a weld cavity 34 and a crucible cavity 36, the weld cavity 34 encompassing the joint. Preparatory to welding, a steel disc 38 is placed on the bottom of the crucible cavity 36 and the cavity is filled with an exothermic welding powder. The powder is then ignited causing the reaction which produces the molten weld metal. The molten metal burns through the steel disc 38 and enters and fills the weld cavity 34. After the weld metal has solidified, which required only about ten seconds, the mold is removed from around the pipe and tubing leaving the completed welded joint as shown in cross-section in FIGURE 2 and in exterior view in FIGURE 4, the solidified weld metal being indicated by the numeral 40.

As previously stated, one of the problems of welding tubing to pipe is that sufficient heat must be produced to bring the pipe to the welding temperature without melting a hole in the tubing. By the arrangement of this invention, the pipe 14 extends within the tubing 12 through the weld area so that even if the tubing is melted through, the weld metal cannot flow into the interior of the tubing.

The most important advantage of the joint of this invention is the provision of areas on both the tubing and the pipe which are easily brought to bonding temperature. The flared end 24 of the tubing 12 is easily brought to bonding temperature by the molten weld metal. At the same time, the raised annular ring portions 22 of pipe 14 are easily brought to bonding temperature so that both the tubing and the pipe are securely bonded by the weld metal 40.

The raised annular ring 22 adjacent the reduced diameter portion 24 of tubing 12 to function primarily as a locating stop for the tubing and, secondarily, to prevent the flow of weld metal into the interior of the tubing.

An alternate arrangement of the invention is shown in FIGURES 7 and 8. In this arrangement, only one raised annular ring portion 22 is required. The tubing 12 is expanded for a length 42 adjacent the end thereof. The expanded end portion 42 receives the reduced diameter end portion 18 of pipe 14 in a manner such that the end 44 of pipe 14 engages the interior of the tubing 12 in an area 46 wherein the enlarged internal diameter portion 42 converges to the normal internal diameter. To provide the configuration of the pipe joint of FIGURE 7, a punch mandrel as shown in FIGURE 8 is utilized which performs the dual function of providing an expanded end portion 42 while at the same time providing the flared end portion 24 in the tubing.

Another embodiment of this invention, shown in FIGURE 5, provides a means of welding together two lengths of tubing 12. As shown, each of the lengths of tubing to be joined is provided with a flared end 24. The joint is completed by the provision of a coupling element, generally indicated by the numeral 48. The element 48 is essentially the configuration provided at the end of pipe 14 and described with reference to FIGURE 1 except that the coupling element 48 is provided with a reduced diameter end portion 18 at each end. The reduced diameter portions 18 are each of an external diameter substantially equal to the internal diameter of the tubing at the end portions thereof adjacent the flared end 24 so that the coupling element 48 slides into each end of the tubing to be joined. The coupling element 48 is further provided with an increased diameter intermediate portion 50 which has at least one, and preferably, as shown, three or more external annular grooves 52. The annular grooves 52 and the intermediate enlarged diameter portion 50 provide the raised annular ring portion 22 as previously described with reference to FIGURE 1.

The coupling joint of FIGURE 5 is welded in the same manner as described with reference to the joint of FIGURE 1 by use of the exothermic welding process as described with reference to FIGURE 3.

The raised annular ring portions 22 and the annular grooves are illustrated as V-shaped in cross-sectional configuration in the drawings. This is the preferred embodiment, however, annular ring portions having a square, rectangular or U-shaped cross-sectional configuration function substantially as effectively and such configurations are within the purview of this invention.

This invention provides a pipe joint and coupling means adaptable in the first instance to join together tubing to pipe by the exothermic welding process and, in the second instance, a coupling joint for welding together two lengths of tubing. The joints of this invention are extremely simple and economical and are highly useful in the welding of tubing.

While this invention has been described with a certain degree of particularity, it is manifest that many changes may be made in the details of construction and the arrangement of components without departing from the spirit and scope of this disclosure.

What is claimed:

1. A pipe joint for welding a length of tubing to a length of pipe, the joint comprising:

a length of tubing; and a length of pipe to be welded to the tubing, the tubing and pipe each having an inner bore therethrough, the tubing being flared at one end providing an enlarged end portion thereon, the pipe having a reduced diameter portion at one end, of an outside diameter substantially equal to the internal diameter of said tubing bore, the reduced diameter portion of the pipe end fitting snugly within the tubing bore, the outer diameter of said tubing and said pipe being substantialy equal in the areas removed from said flared and reduced ends, said pipe having at least one raised annular ring portion having a V-shaped cross-section, said ring portion abutting the inner surface of said flared end portion of said tubing, the wall thickness of said tubing being substantially equal to the wall thickness of the reduced diameter portion of said pipe end and substantially less than the thickness of the pipe wall adjacent said reduced end portion, said annular ring portion providing an area easily heated to a welding temperature whereby said annular ring portion and said tubing wall are concurrently brought to welding temperature and welding material deposited in the area of said flared end portion and said annular ring and adhered thereto.

2. A pipe joint according to claim 1 wherein the pipe has a plurality of grooves adjacent the reduced diameter end portion providing a plurality of raised annular ring portions adjacent the enlarged end portion of said tubing when the joint is assembled.

References Cited

UNITED STATES PATENTS

| 220,910 | 10/1879 | Bradley | 285—287 |
|---|---|---|---|
| 278,061 | 5/1883 | Sullivan | 285—287 |
| 284,350 | 9/1883 | Zistel | 285—334.5 X |
| 300,005 | 6/1884 | Patterson | 285—287 |
| 1,595,309 | 8/1926 | Mueller et al. | 285—287 |
| 1,905,315 | 4/1933 | Priebe | 285—286 X |
| 3,042,428 | 7/1962 | Gardiner | 285—286 X |

CARL W. TOMLIN, *Primary Examiner.*

D. W. AROLA, *Assistant Examiner.*